April 3, 1956 E. L. BARRETT 2,740,955

MAGNETIC ANNUNCIATOR

Filed June 7, 1951 2 Sheets-Sheet 1

INVENTOR
Edward L. Barrett
By Carlson, Pitzner, Hubbard & Wolfe
ATTORNEYS

MAGNETIC ANNUNCIATOR

Filed June 7, 1951 2 Sheets-Sheet 2

INVENTOR
Edward L. Barrett
By Carlson, Pitzner, Hubbard & Wolfe
ATTORNEYS 2,740,955

MAGNETIC ANNUNCIATOR

Edward L. Barrett, La Grange, Ill., assignor to Donald B. Alexander, Edgar R. Bourke, Henry T. Chamberlain, John F. Mannion, Ernest W. Schneider, Walter A. Wade, and Charles S. Vrtis, not individually, but as trustees of The Arthur J. Schmitt Foundation, a charitable trust Application June 7, 1951, Serial No. 230,269

9 Claims. (Cl. 340—373)

This invention relates to magnetic annunciators for providing a visible indication of whether or not an electrical circuit is energized. Such annunciators may be employed to indicate whether an apparatus is off or on, or whether a control member is in one position or another. The invention has particular application to annunciators for replacing pilot lights in situations where the latter are not entirely satisfactory because they are not sufficiently reliable or because they produce undesirable eye strain. Magnetic annunciators are preferable to pilot lamps for use on the pilot's control panel in an airplane, for example, since the annunciators are not subject to burning out, and since they do not produce any glare to impair the vision of the pilot.

An object of the invention is to provide improved magnetic annunciators which are extremely reliable in operation. In this connection, it is an object of the invention to provide an annunciator in which the movable indicator cannot become stalled in a dead center position.

A further object of the invention is to provide magnetic annunciators which have outstanding magnetic efficiency, considering space limitations imposed upon the annunciators. By virtue of magnetic efficiency, the annunciators may be small in size and positive in operation.

A further object is to provide magnetic annunciators which are not subject to interference from adjacent units so that the annunciators may be spaced close together.

A further object is to provide annunciators which are extremely compact and which have a small frontal area so that a large number of annunciators may be mounted in a predetermined panel space. The small frontal area is particularly important in annunciators which are to replace pilot lights.

A further object is to provide an annunciator which produces a change of indication over almost its entire frontal area, so that an easily read signal is produced by a relatively small annunciator.

It is an object of the invention to provide improved magnetic annunciators which are rugged, extremely resistant to vibration and shock, and easy and economical to manufacture.

Further objects, advantages and features of the invention will appear from the following description of an illustrative magnetic annunciator constructed in accordance with the invention. The description should be taken in connection with the accompanying drawings in which.

Figure 1:
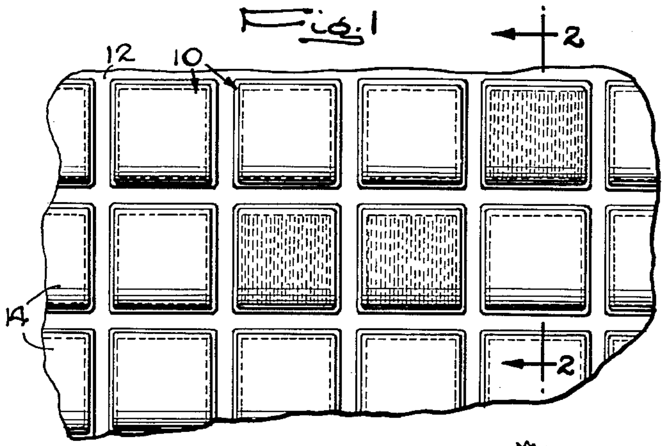
Figure 1 is a front elevational view of a plurality of magnetic annunciators arranged in rows on a panel.

While the invention is susceptible of various modifications and alternative constructions, there is shown in the drawings and will herein be described in detail the preferred embodiment, but it is to be understood that it is not thereby intended to limit the invention to the form disclosed, but it is intended to cover all modifications and alternative constructions falling within the spirit and scope of the invention as expressed in the appended claims.

Figures 2, 3:
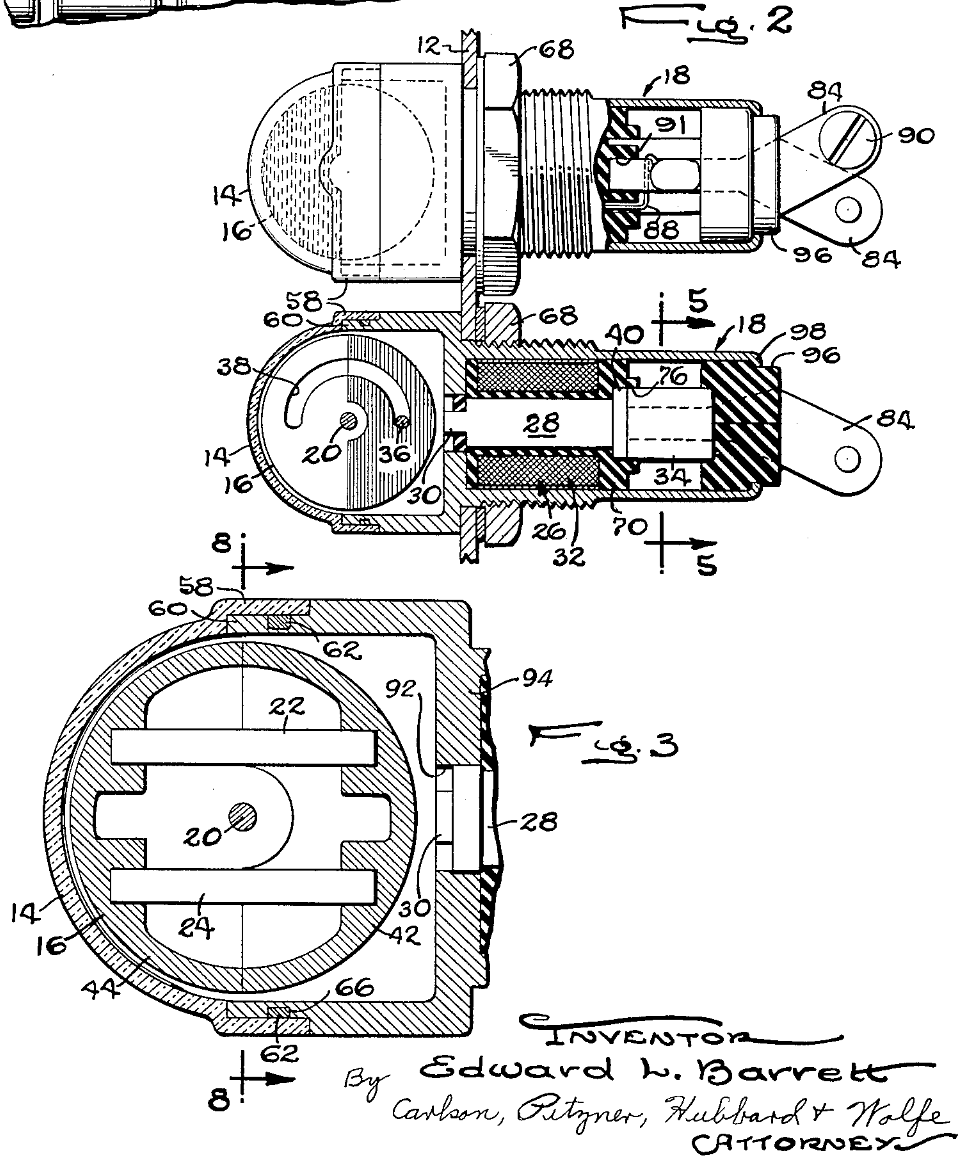
Fig. 2 is an elevational sectional view taken generally as indicated by the line 2—2 in Fig. 1.
Fig. 3 is an enlarged fragmentary sectional view similar to Fig. 2 showing particularly some of the details of the annunciator rotor.

In Fig. 1 a plurality of magnetic annunciators 10 are shown mounted on a panel 12 which may be the pilot's panel in an airplane. As shown in Figs. 2 and 3, each of the annunciators 10 has a semi-cylindrical window 14 through which a cylindrical rotor 16 is visible. The rotor 16 is mounted for rotation in a generally tubular housing 18 by means of a pin 20 which is oriented at right angles to the central axis of the housing 18. In order to give an indication of its position, the rotor has different markings on its opposite halves. For example, the rotor 16 may be half dark and half light so that the appearance of the annunciator 10 changes noticeably as the rotor turns on its axis. The light half of the rotor may have a luminous coating to provide for night visibility. In Fig. 1 some of the annunciators 10 have a light appearance and others have a dark appearance. An annunciator that appears dark may indicate that a certain device is turned off and an annunciator that appears light may indicate that a device is turned on. Fig. 2 shows two of the annunciators 10, the upper one being unenergized or off and the lower one being energized or on.

The rotor is rotated by the effect of a magnetic field upon a permanent bar magnet 22 carried by the rotor 16, as clearly shown in Fig. 3. The rotor also carries a counterweight 24 to counterbalance the permanent magnet 22. The longitudinal axis of the permanent bar magnet 22 extends in a direction at right angles to the axis of rotation of the rotor 16. The longitudinal axis of the magnet 22 is spaced a substantial distance from the rotary axis of the rotor.

An electromagnet 26 is mounted in the housing 18 to produce a magnetic field for rotating the rotor 16. The electromagnet 26 includes a magnetically permeable core 28 having a narrow tip 30 spaced close to the periphery of the rotor 16. The core 28 lies along the central axis of the housing 18 at right angles to the axis of the rotor 16. The electromagnet 26 also includes a coil 32 which is wound around the core 28.

In order to bias the rotor 16 to an initial position, occupied by the rotor as shown in Fig. 3, a biasing permanent magnet 34 is positioned adjacent the rear end of the core 28. The biasing magnet 34 preferably abuts against the core 28 and is positioned along the central axis of the housing 18.

When the coil 32 is not energized, the permanent biasing magnet 34 produces a magnetic flux in the core 28 so that the tip 30 of the core attracts one end of the rotor magnet 22. If the rotor 16 were entirely free to rotate, it would turn until the rotor magnet 22 pointed directly at the tip 30 of the core 28. However, the rotor 16 is stopped short of this dead center position by means of a stop pin 36 which is carried by the housing 18 and which runs in a semi-circular groove 38 in the end of the rotor 16. Thus the rotor 16 comes to rest in a position in which there is tangential spacing between the tip 30 of the core 28 and the adjacent end of the magnet 22. As shown in Fig. 3, the magnet 22 may then extend generally in the direction of the central axis of the housing 18.

When the coil 32 is energized with direct current, the coil produces a greater magnetizing force in the core 28 than does the biasing permanent magnet 34, so that the direction of the magnetic flux in the core is reversed. The pole tip 30 of the core 28 then repels the adjacent end of the rotor magnet 22 so that the rotor 16 is turned through approximately one-half revolution, until the other end of the magnet 22 is adjacent the core tip 30. The stopping pin 36 and the semi-circular stopping groove 38 bring the rotor to rest in a position in which there is tangential spacing between the core tip 30 and the adjacent end of the rotor magnet 22. Thus the direction of the rotor magnet 22 is reversed when the coil 28 is energized.

The construction of the rotor 16 is particularly advantageous in a number of respects. The magnet 22 is spaced a considerable distance from the rotary axis of the rotor so that magnetic forces acting between the tip of the core 28 and the ends of the magnet 22 have substantial tangential components. The magnet 22 is made as long as the diameter of the rotor 16 permits in order to bring the ends of the magnet close to the tip of the core 28 while maintaining tangential spacing between the components. The long magnet provides a long torque arm for the magnetic forces between the core 28 and the permanent magnet 22.

Figures 4, 5, 6, 7, 8:
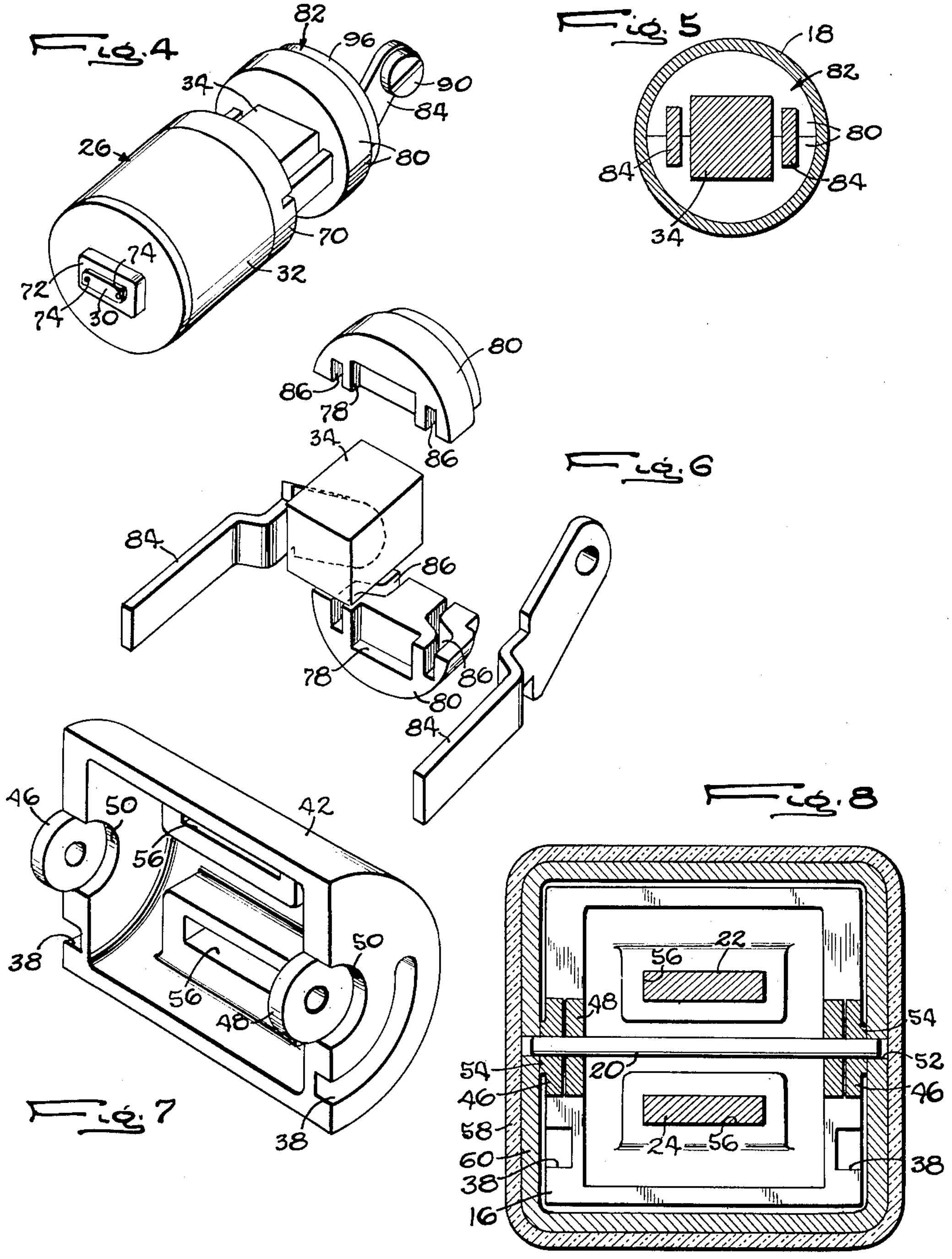
Fig. 4 is a perspective view of a magnet assembly forming a part of the annunciator.
Fig. 5 is a fragmentary sectional view, taken as indicated by the line 5—5 in Fig. 2.
Fig. 6 is an exploded view of some of the components illustrated in Fig. 4.
Fig. 7 is a perspective view of a component part of the rotor.
Fig. 8 is a sectional view taken as indicated by the line 8—8 in Fig. 3.

As clearly shown in Fig. 8, the magnet 22 has a rectangular cross section which has an elongated dimension extending parallel with the axis of rotation of the rotor. This conformation of the magnet provides a large cross-sectional area while maintaining the spacing between the magnet and the axis of rotation. All of these constructional features of the rotor give assurance that the rotor will reverse its position when the coil is energized or de-energized.

The construction of the other components of the magnetic circuit is also magnetically advantageous. The narrowing down of the tip 30 of the core 28 concentrates the magnetic flux near the axis of the core within the tip 30. Consequently, the magnetic force exerted by the tip 30 upon the magnet 22 acts from a point near the axis of the core. For this reason, a large component of the magnetic force between the core and the magnet is tangentially directed and is thereby effective to rotate the rotor 16. As most clearly shown in Fig. 4, the tip 30 of the core is elongated along a dimension parallel to the axis of the rotor. This elongation corresponds to the elongated dimension of the cross section of the magnet 22. The elongation of the core tip 30 provides low reluctance in the air gap between the core and the magnet.

The body of the core 28 has a larger cross section than the tip 30 in order to provide low reluctance in the magnetic circuit. The body of the core 28 may have a circular cross section. The core 28 has a rectangular rearward extension or base 40 which has a larger cross section than the body of the core. The base 40 serves a number of purposes. Because its cross section corresponds to the cross section of the permanent biasing magnet 34, the base 40 acts as a collector plate to provide a low reluctance path for flux passing from the biasing magnet into the core 28 during periods when the coil 32 is not energized. When the coil is energized, the base 40 provides a low reluctance leakage path for the flux from the biasing magnet 34, the flux leaking laterally out of the base and then extending through the surrounding space to the opposite end of the biasing magnet. When the coil is energized, the base 40 also serves as part of the return path of the flux of the electromagnet. Because of the low reluctance of the base 40, as compared with the material of the biasing magnet 34, the flux of the electromagnet 26 is thereby diverted outwardly from the biasing magnet 34, so that the electromagnet will not tend to demagnetize the biasing magnet.

The dimensions of the core 28 and the biasing magnet 34 are particularly advantageous. The biasing magnet 34 is short with respect to the core 28 in order to minimize leakage flux when the coil 32 is not energized. On the other hand, the biasing magnet 34 is long enough to be magnetically effective. Making the length of the biasing magnet about one-half the length of the core 28, as illustrated, is a suitable proportion. The cross-sectional area of the biasing magnet 34 may advantageously be somewhat greater than the area of the core in order to provide a large biasing flux in the core while minimizing leakage flux when the coil 32 is not energized.

The magnetic materials employed in the annunciator have considerable influence on its performance. The core 28 may be made from a material such as soft steel having a high permeability and a low coercive force. The rotor magnet 22 and the biasing magnet 34 may be made from a material such as "Alnico VI" which has relatively low permeability but extremely high coercive forces when exposed to a reverse magnetic field. Use of such material in the magnets 22 and 34 largely prevents demagnetization of the magnets by the coil 32.

Extremely reliable operation of the annunciator is secured by constructing its magnetic circuit as described above. The rotor is held in both of its indicating positions by strong magnetic forces so that vibrations and shock do not move the rotor appreciably. In the construction outlined above, it has been found unnecessary to provide a return flux path made of magnetic material. Instead, the return path of the flux is through the space surrounding the annunciator. Despite the elimination of a ferro-magnetic return path, the operation of the annunciator is extremely reliable. Moreover, the electrical power needed to operate the annunciator may be as low as two watts or even less. The elimination of a metallic return path provides an extremely compact construction having a small frontal area. Even without a metallic return path, the annunciator is so compact and efficient magnetically that adjacent units do not affect each other appreciably.

The annunciator embodies a number of mechanical features which make for reliable operation and economical manufacture. The rotor 16 includes a pair of identically shaped semi-cylindrical half shells 42 and 44 which nest together to form the body of the rotor. The half shells may be molded from a plastic material. The cylindrical peripheries of the half shells 42 and 44 are provided with different markings for visually indicating the position of the rotor 16. For example, the half shell 42 may be colored white and the half shell 44 black. The white half shell may have a luminous coating for night visibility.

The half shells 42 and 44 are held together in nested position by the pin 20 which extends through circular hubs 46 and 48 formed on the half shells. Semi-circular recesses 50 are provided adjacent the hubs to receive the hubs of the opposite half shell. The ends of the pin 20 have a sliding fit in apertures 52 in the housing 18. The pin also has a sliding fit in the hubs 46 and 48 so that the rotor is free to rotate on the pin and the pin is free to rotate in the housing. This construction gives assurance against binding between the rotor and the housing.

The hubs 46 are positioned on the ends of the rotor when the half shells 42 and 44 are nested. The hubs 46 have protruding noses or bosses 54 which space the rotor from the housing 18.

The magnet 22 and the counterweight 24 are carried inside the half shells 42 and 44 in recesses 56. The magnet 22 and the counterweight 24 are made similar in size so that the half shells 42 and 44 may be molded from the same dies.

The rotor is easily assembled by inserting the magnet 22 and the counterweight 24 into the recesses in one of the shells, nesting the shells 42 and 44 together, and inserting the pin 20. The magnet 22 and the counterweight 24 extend between the half shells in the direction of nesting motion to facilitate assembly.

The pin 20 is retained in the housing 18 by a rectangular skirt 58 on the semi-cylindrical window 14. The skirt 58 fits over a rectangular front portion 60 of the housing 18. The window may be secured on the housing by means of drops of cement 62 which are placed in recesses 66 in the rectangular head 60 of the housing. After the window and the housing are assembled the cement hardens and adheres to the window to form cement pins which retain the window in place despite severe shock and vibration.

The annunciator may be mounted on the panel 12 by means of a nut 68 threaded on the housing 18.

The stationary magnetic components of the annunciator are constructed for easy manufacture and assembly. The coil 32 is wound on a bobbin 70 which fits over the core 28. The base 40 of the core serves as a stop to limit rearward motion of the bobbin on the core. A rectangular washer 72 is slipped over the tip 30 of the core and the corners 74 of the tip are clinched or staked against the washer to secure the core in the bobbin.

The bobbin 70 has a recess 76 in its rear face to receive the front end of the permanent biasing magnet 34. The other end of the biasing magnet is carried in recesses 78 in the halves 80 of a split bushing 82.

A pair of terminal bars 84 are carried in zig-zag grooves 86 in the halves of the split bushing 82. The bars are bent in zig-zag fashion to retain them in the bushing against endwise movement. The end leads 88 of the coil 32 are soldered to the terminal bars between the bushing and the bobbin 70. The outer ends of the terminal bars are provided with screws 90 for attaching connecting wires. The bobbin 70 may have recesses 91 in order to hold the front ends of the bars 84. The bars are thus secured against severe shock and vibration.

It is a simple matter to assemble the various components in the housing 18. The bobbin 70, the core 28, the permanent magnet 34, the terminal bars 84, and the split bushing 82 may first be assembled to form a sub-assembly which may be inserted as a unit into the housing 18. Cement may be applied liberally to hold the sub-assembly together and to increase the resistance of the annunciator to vibration and shock. The core tip 30 extends through a rectangular aperture 92 in a transverse partition 94 which divides the housing into two compartments, one for receiving the rotor 16, and the other to receive the other components. The washer 72 fits into the aperture 92 to orient the core tip 30 with respect to the rotor. After the sub-assembly is inserted into the housing, the bushing 82 is pushed forward to take up any clearance. Then the rear end of the housing is spun over a shoulder formed by a reduced end portion 96 of the bushing 82 to form a crimp 98 which retains the bushing in the housing.

I claim as my invention:

1. In a magnetic annunciator, an elongated housing having a window closing its front end, a generally cylindrical rotor positioned inside the housing to be visible through the window, means carrying the rotor for rotation on the housing about the cylindrical axis of the rotor, a permanent bar magnet carried by the rotor generally at right angles to the rotary axis and spaced a substantial distance from the axis, a counterweight carried by the rotor to counterbalance the magnet, cooperating stop means on the rotor and the housing limiting the rotation of the rotor to approximately a half revolution between positions in which the magnet extends in a predetermined direction and the reverse direction on opposite sides of the rotary axis, an electromagnet having a magnetically permeable core spaced rearwardly from the rotor and extending along a center line running from the axis of rotation of the rotor in the predetermined direction, the electromagnet including a coil wound around the core, and a permanent magnet positioned at the rear of the core to bias the rotor to one of its positions, the rotor having distinguishing markings on its opposite halves to provide a visible indication of its position.

2. In a magnetic annunciator, a generally tubular housing, a semi-cylindrical window closing the front end of the housing, a cylindrical annunicator rotor positioned within the housing to be visible through the window, means pivotally mounting the rotor on the housing on an axis perpendicular to the longitudinal axis of the housing, a permanent bar magnet carried by the rotor at right angles to its axis of rotation and spaced a substantial distance from the axis, a counterweight on the rotor to counterbalance the magnet, cooperating stop means on the rotor and the housing providing for movement of the rotor between a first position in which the bar magnet extends longitudinally of the housing on one side of the rotational axis and a second position in which the rotor is displaced approximately a half revolution from the first position, an electromagnet in the housing spaced rearwardly from the rotor, the electromagnet including a magnetically permeable core positioned along the central axis of the housing and a coil wound around the core, a permanent bar magnet carried in the housing to the rear of the core to provide means for biasing the rotor to one of its positions, terminal conductors extending from the coil rearwardly out of the housing, and a split terminal bushing enclosing the terminal conductors and spacing them from the housing, the rear end of the housing having a crimped portion to retain the split bushing.

3. In a magnetic annunciator, a rotor, a pin carrying the rotor for rotation thereon, a housing having an open end provided with bearing apertures receiving the pin, and a window closing the open end of the housing, the window having a skirt fitting over the open end of the housing and covering the bearing apertures to retain the pin.

4. In a magnetic annunicator, a housing having an open end, a rotor carried in the open end of the housing, a window closing the open end of the housing, the window having a skirt fitting over the housing, the housing having a plurality of recesses positioned to be covered by the skirt, and cement filling the recesses and adhering to the window to retain the window on the housing.

5. In a magnetic annunciator, an electromagnet having a core providing a localized pole piece at one end thereof, a cylindrical rotor arranged directly opposite said pole piece for rotation about a transverse axis through substantially 180°, an elongated permanent bar magnet mounted chord-wise in said rotor spaced from the axis of rotation thereof, stops for limiting rotation of the rotor between a first limit position in which one end of the bar magnet is offset downwardly from the pole piece and a second limit position in which the opposite end of the bar magnet is offset upwardly from the pole piece, means for applying a normal magnetic flux in said electromagnet for normally magnetizing said pole piece with a given polarity so that said rotor is drawn into its first limit position, and means for applying current to said electromagnet for reversing the polarity of the pole piece, thereby to cause rotation of the rotor for drawing into its second limit position.

6. In a magnetic annunciator, an electromagnet having a core providing a localized pole piece at one end thereof, a cylindrical rotor arranged directly opposite said pole piece for rotation about a transverse axis through substantially 180°, an elongated permanent bar magnet mounted chord-wise in said rotor spaced from the axis of rotation thereof, stops for limiting rotation of the rotor between a first limit position in which one end of the bar magnet is offset tangentially from the pole piece in one direction and a second limit position in which the opposite end of the bar magnet is offset tangentially from the pole piece in the opposite direction, means for applying a normal magnetic flux in said electromagnet for normally magnetizing said pole piece with a given polarity so that said rotor is drawn into its first limit position, means for applying current to said electromagnet for reversing the polarity of the pole piece thereby to cause rotation of the rotor to its second limit position, and a non-magnetic weighty element in said rotor for counterbalancing the weight of the bar magnet.

7. In a magnetic annunciator, an electromagnet having a core providing a localized pole piece at one end thereof, a cylindrical rotor arranged directly opposite said pole piece for rotation about a transverse axis through substantially 180°, an elongated permanent bar magnet mounted chord-wise in said rotor spaced from the axis of rotation thereof, stops for limiting rotation of the rotor between a first limit position in which one end of the bar magnet is offset downwardly from the pole piece and a second limit position in which the opposite end of the bar magnet is offset upwardly from the pole piece, a permanent magnet for applying a normal magnetic flux in said electromagnet for normally magnetizing the core of said electromagnet with a given polarity so that said rotor normally occupies its first limit position, and means for applying current to said electromagnet for reversing the polarity of the flux in the core thereby to cause rotation of the rotor to its second limit position.

8. In a magnetic annunciator, an electromagnet having a core providing a localized pole piece at one end thereof, a rotor arranged opposite said pole piece for rotation about an axis which extends transversely with respect to the pole piece, a permanent bar magnet mounted chord-wise in said rotor spaced from the axis of rotation thereof, stops for limiting rotation of the rotor between a first limit position in which one end of the bar magnet is offset tangentially in one direction from the pole piece and a second position in which the opposite end of the bar magnet is offset tangentially in the opposite direction from the pole piece, means including a permanent magnet magnetically coupled to the end of said core opposite said pole face for applying a normal magnetic flux in said electromagnet for normally magnetizing said core with flux of a given polarity so that said rotor normally occupies its first limit position, and means for applying current to said electromagnet for overcoming the normal flux and reversing the flux in the core thereby to cause rotation of the rotor to its second limit position.

9. In a magnetic annunciator, an electromagnet having a core providing a localized pole piece at one end thereof, a rotor arranged opposite said pole piece for rotation about an axis which extends transversely with respect to the pole piece, a permanent magnet mounted in said rotor and presenting ends of unlike polarity at spaced points on the periphery which are offset in the same direction from the median plane of the rotor, stops for limiting rotation of the rotor between a first limit position in which one end of the magnet is offset tangentially in one direction from the pole piece and a second position in which the opposite end of the magnet is offset tangentially in the opposite direction from the pole piece, means including a permanent magnet magnetically coupled to said core for normally magnetizing said core with flux of a given polarity so that said rotor normally occupies its first limit position, and means for applying current to said electromagnet for overcoming the normal flux and reversing the flux in the core thereby to cause rotation of the rotor to its second limit position.

References Cited in the file of this patent

UNITED STATES PATENTS

| | | |
|---|---|---|
| 362,135 | Wilson | May 3, 1887 |
| 1,787,620 | Favarger | Jan. 6, 1931 |
| 1,940,718 | Koch | Dec. 26, 1933 |
| 2,159,820 | Reis | May 23, 1939 |
| 2,179,792 | Lappin | Nov. 14, 1939 |
| 2,188,803 | Boehne | Jan. 30, 1940 |
| 2,245,493 | Nothe | Jan. 10, 1941 |
| 2,270,141 | Potter | Jan. 13, 1942 |
| 2,388,449 | Sundt et al. | Nov. 6, 1945 |
| 2,555,791 | Everett | June 5, 1951 |
| 2,632,888 | Brookes | Mar. 24, 1953 |

FOREIGN PATENTS

| | | |
|---|---|---|
| 122,882 | Sweden | Oct. 5, 1948 |